United States Patent [19]
Fouts

[11] Patent Number: 5,908,090
[45] Date of Patent: Jun. 1, 1999

[54] WHIP DAMPENER ASSEMBLY FOR VEHICLE BRAKE HOSE SYSTEM

[75] Inventor: Robert E. Fouts, Rancho Palos Verdes, Calif.

[73] Assignee: Earl's Supply Co., Long Beach, Calif.

[21] Appl. No.: 08/794,834

[22] Filed: Feb. 4, 1997

[51] Int. Cl.⁶ .................................................... F16D 55/00

[52] U.S. Cl. ................... 188/71.1; 138/125; 138/DIG. 3; 248/60

[58] Field of Search ............................ 188/71.1, 38, 352, 188/152, 381, 208; 138/103, 107, 110, 123–125, DIG. 3; 384/1, 441; 24/455; 81/9.3; 248/56, 60, 62, 75, 80, 230, 231, 231.1

[56] References Cited

U.S. PATENT DOCUMENTS

| | | | |
|---|---|---|---|
| 4,991,695 | 2/1991 | Hellmer | 188/22.4 |
| 5,460,247 | 10/1995 | Fouts . | |
| 5,639,528 | 6/1997 | Feit | 428/36.91 |

*Primary Examiner*—Robert J. Oberleitner
*Assistant Examiner*—C. T. Bartz
*Attorney, Agent, or Firm*—Oppenheimer Wolff & Donnelly LLP

[57] ABSTRACT

A flexible brake hose assembly which is less expandable than traditional O.E.M. brake hose assemblies and thereby improves efficiency of the entire braking system. The assembly incorporates a short piece of more flexible hose (similar to the O.E.M. brake hose) to act as a whip dampener which assures the survival of the assembly during the D.O.T. whip test and under the real life conditions than the tests represent.

8 Claims, 1 Drawing Sheet

WHIP DAMPENER ASSEMBLY FOR VEHICLE BRAKE HOSE SYSTEM

BACKGROUND OF THE INVENTION

1. Field of the Invention

The invention relates to vehicle braking systems, and more particularly to a vehicle brake hose system where the hose is comprised of a relatively stiff (low expansion) inner liner with a metal braid covering to provide the required strength. In hoses of this type of construction, it is necessary to provide some type of whip dampener within the assembly in order for it to pass the Department of Transportation's (DOT) whip test specified in federal motor vehicle safety standard No. 106 (FMVSS 106).

2. Description of the Related Art

In my U.S. Pat. No. 5,460,247, the teachings of which are incorporated herein of interest, I disclose a hose system for brakes of vehicles adapted to replace the flexible hose of a vehicle that extends from the pre-existing brake caliper of a vehicle through a bracket and to the pre-existing rigid metal tubing of the vehicle and thence to the pre-existing brake master cylinder of the vehicle. The system includes a flexible hose of stainless steel braid protected extruded Teflon material having a whip dampening member mounted on the hose receivable in the pre-existing bracket of the vehicle.

In the system of my U.S. Pat. No. 5,460,247, which works quite well, there is a need for providing a portion of flexible hose between the whip dampener and the rigid tubing of the vehicle coupled to the brake master cylinder. In that system, there was a need to reroute or shorten the original preexisting piece of rigid tubing. P In my co-pending application Ser. No. 08/863,734, filed May 27, 1994, I disclose a hose system wherein a bracket assembly is provided for the whip dampener in my U.S. Pat. No. 5,460,247 where preexisting rigid metal tubing of a vehicle may be used while retaining the flexing required to carry out the whip dampening desired.

Although both whip dampener systems work quite well, I have discovered that a short piece of flexible hose that is more flexible than the preexisting hose of such vehicle braking systems may be used as a whip dampener. Such an arrangement is inexpensive and meets D.O.T. requirements while still providing the advantage of a hose assembly which greatly reduces the expansion of said assembly and thereby improves the efficiency of the entire brake system

SUMMARY OF THE INVENTION

It is an object of this invention to provide a vehicle with a brake hose assembly which is constructed primarily of a relatively stiff (low expansion) inner liner over braided with a material, (preferably stainless steel wire) which will provide the strength required, and yet also incorporates a short piece of more flexible hose at a predetermined location which serves as a whip dampener. The purpose of the whip dampener is to provide the flexibility required to meet the requirements of the D.O.T. whip test specified in FNVSS-106 and the real life combination of steering and suspension movements that the test simulates. This new hose assembly is a direct replacement for the original O.E.M. assembly and attaches to all brackets and rigid tubing of the vehicle exactly as did the original hose assembly.

DESCRIPTION OF THE PREFERRED EMBODIMENT

Figure 1:
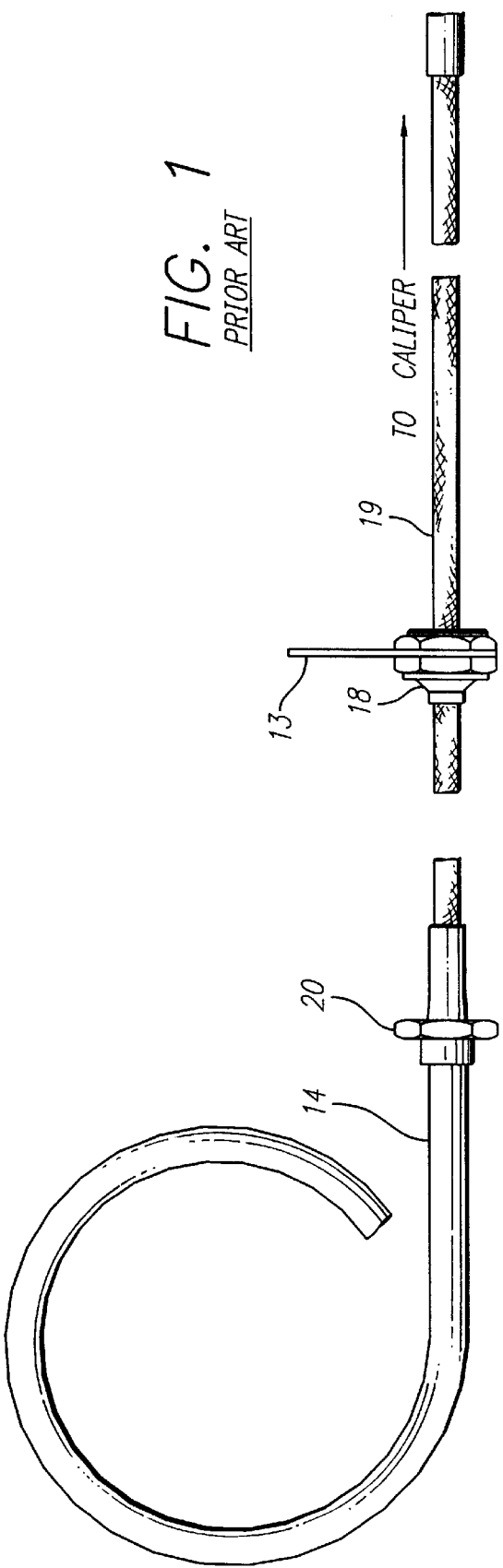
FIG. 1 is an elevational view of the whip dampener assembly disclosed in my U.S. Pat. No. 5,460,247, the teachings of which are incorporated herein by reference.

Referring now to FIG. 1 of the drawing, a prior art whip dampener assembly as discussed in U.S. Pat. No. 5,460,247 is shown. Thus, a conventional brake hose 19 extends from the caliper of the vehicle (not shown) through a pre-existing conventional bracket 13 mounted to the vehicle chassis. Hose 19 is preferably a low expansion inner liner of a material less flexible than rubber braided on its exterior with a stiffer material, such as stainless steel wire. Rigid tube 14 is coupled via connector fitting 20 to bracket 13 and extends to the brake master cylinder (not shown) of the vehicle. Thus, in such a typical installation, hydraulic pressure from the brake master cylinder is transmitted through steel tube 14 to bracket 13 with flexible hose 11 leading to the brake caliper.

Whip dampening means 18, as disclosed in my U.S. Pat. No. 5,460,247, is shown associated with bracket 13 with hose 19 passing through bracket 13 extending to a connector fitting and then to the brake master cylinder (not shown).

Figure 2:
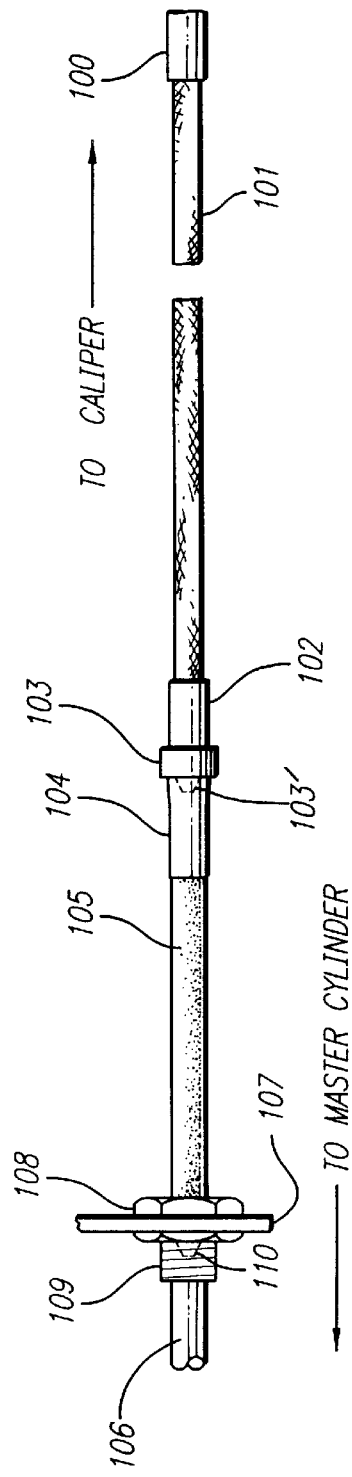
FIG. 2 is an elevational view of a whip dampener assembly in accordance with the teachings of the invention.

Referring now to FIG. 2 as particularly contemplated in the present invention, fitting 100 is adapted to be coupled to the brake caliper of a vehicle. Hose 101 extends from fitting 100 and may be a brake hose of the same structure as aforementioned hose 19. Hose 101 extends to a crimping sleeve 102 having an integral collar 103 opening at opening 103', as seen in dotted lines, into the interior of fitting 104. Fitting 104 has a generally cylindrical main body portion with an enlarged flared end adjacent collar 103. As particularly contemplated in the present invention, a whip dampener is provided in the form of a short piece of hose or tubing 105 of fabric braided reinforced elastomeric material coupled at one end into the generally cylindrical portion of fitting 104, fitting 104 being crimped to hose or tubing 105, and at the other end to a terminal fitting 109, having outlet 110 (shown in dotted lines) secured to the preexisting bracket 107 of the vehicle. Nut assembly 108 secures fitting 109 to bracket 107. Rigid tubing 106 coupled to fitting 109 provides fluid communication between tubing 105 and the master cylinder.

Any suitable means may be used to couple tubing 105 to hose 101 at one end and to the rigid tubing 106 at the other end while providing fluid communication therebetween. Any suitable length of tubing 105 may be used. However, tubing lengths of about 2 inches are preferred. Tubing 105 may also be of any suitable diameter, such as 7/16 inches. Tubing 105 may be of rubber having a fabric braid on its exterior.

The resulting hose assembly reduces vibration felt in ABS brake systems when hydraulic pressure is applied to the brakes. The short piece of resilient hose 105 becomes the whip dampener of the assembly and assures that the entire assembly will survive both the D.O.T.'s required whip test and the real life movements of steering and suspension that the test represent. The advantage of stiffer hose is maintained while allowing the hose system to pass the D.O.T. whip test.

I claim:

1. A hose system for the brakes of a vehicle adapted to extend between a brake caliper and a brake master cylinder of the vehicle through a bracket on the vehicle comprising:

a hose having a first end and a second end;

whip dampening means associated with the bracket of the vehicle;

said first end of said hose fluidly coupled to said brake caliper; wherein the improvement comprising:
  said whip damping means comprising a resilient tubing;
  a fitting assembly fluidly coupled to said second end of said hose; and
  said resilient tubing fluidly coupled to said fitting at one end of said resilient tubing and fluidly coupled to said brake master cylinder at opposite end through said whip dampening means.

2. In the hose system of claim 1 wherein said resilient tubing is a material more flexible than said hose.

3. In the hose system of claim 2 wherein said resilient tubing is made of rubber.

4. In the hose system of claim 1 wherein said resilient tubing is a fabric braided reinforced elastomeric material.

5. In the hose system of claim 1 wherein said resilient tubing is about 2 inches long.

6. In the hose system of claim 1 wherein said fitting assembly further includes a crimping sleeve fluidly coupled to said fitting having said resilient tubing fixed at one end.

7. In the hose system of claim 6 wherein said hose extends from the brake caliper of the vehicle to said crimping sleeve fluidly coupled to said fitting.

8. In the hose system of claim 1 wherein said resilient tubing being fluidly coupled to said hose at one end and fluidly coupled to said vehicle master cylinder at opposite end.

* * * * *

UNITED STATES PATENT AND TRADEMARK OFFICE
CERTIFICATE OF CORRECTION

PATENT NO. : 5,908,090
DATED : June 1, 1999
INVENTOR(S) : Robert E. Fouts

It is certified that error appears in the above-indentified patent and that said Letters Patent is hereby corrected as shown below:

Col. 3, line 3, "damping" should be --dampening--.

Signed and Sealed this

Sixteenth Day of November, 1999

Attest:

Q. TODD DICKINSON

*Attesting Officer*      *Acting Commissioner of Patents and Trademarks*